United States Patent [19]
Ito et al.

[11] Patent Number: 5,395,668
[45] Date of Patent: Mar. 7, 1995

[54] AIR BAG APPARATUS

[75] Inventors: Keizou Ito; Takashi Kato; Syoji Sakaida; Hikaru Ando; Yuji Kuriyama, all of Aichi, Japan

[73] Assignee: Toyoda Gosei Co., Ltd., Nishikasugai, Japan

[21] Appl. No.: 987,787

[22] Filed: Dec. 9, 1992

Related U.S. Application Data

[63] Continuation-in-part of Ser. No. 750,867, Aug. 28, 1991, abandoned.

[30] Foreign Application Priority Data

Aug. 29, 1990 [JP] Japan .................. 2-229007
Dec. 13, 1991 [JP] Japan .................. 3-330487

[51] Int. Cl.⁶ .................................................. B65D 65/28
[52] U.S. Cl. .................................. 428/43; 280/728 B; 428/304.4
[58] Field of Search .................. 280/728 B; 428/43

[56] References Cited

U.S. PATENT DOCUMENTS 5,118,132 6/1992 Nakajima .................. 280/728
5,131,678 7/1992 Gardner et al. .................. 280/732

FOREIGN PATENT DOCUMENTS 62-19419 1/1987 Japan .

Primary Examiner—George F. Lesmes
Assistant Examiner—C. Raimund
Attorney, Agent, or Firm—Cushman, Darby & Cushman

[57] ABSTRACT

An air bag apparatus in which the appearance of the interface between the portion covering the air bag and portions surrounding it can be improved, the number of components can be reduced, and the assembly process can be shortened. A cover unit covers an air bag, which inflates on a predetermined occasion, consists of a cover which opens with the inflation of the air bag, and a body for holding the cover. The cover unit is an integrally molded product in which a skin is formed on a substrate, and includes, at the location connecting the periphery of the cover with the body, a breakaway portion along which the cover is separable from the body when the air bag inflates, and a hinge portion for maintaining the connection of the body and the cover. In the breakaway portion, the substrate has a fragile portion, and the skin is separated into two parts at the position of the fragile portion. In the hinge portion, the substrate and skin are continuously formed and extend from the body to the cover.

11 Claims, 4 Drawing Sheets

AIR BAG APPARATUS

CROSS REFERENCE TO RELATED APPLICATIONS

This application is a continuations-in-part of U.S. application Ser. No. 07/750,867, filed Aug. 28, 1991, now abandoned.

BACKGROUND OF THE INVENTION

1. Field of the Invention

This invention relates to an air bag apparatus, which is disposed in an instrument panel in front of a front passenger's seat of an automobile, in a side door, in a steering wheel, or the like, with the air bag inflating upon the occurrence of a predetermined event.

2. Description of the Related Art

Conventionally, in an air bag apparatus for a front passenger's seat of a vehicle, a cover for covering an air bag is disposed at an opening formed in an instrument panel (hereinafter "panel"), using a hinge or breakaway means which is broken upon the occurrence of a predetermined event so that the cover opens, as disclosed in a Japanese Unexamined Utility Model Publication No. 111353/1988.

However, this configuration where a cover is attached to a panel through a hinge or breakaway means increases the number of components of such an air bag apparatus, whereby the assembly process is prolonged.

Furthermore, since a hinge or breakaway means is used to attach a separate cover to a panel, any errors in dimensional accuracy of each component or in assembly accuracy may result in an ugly appearance at the interface between the cover and the panel.

SUMMARY OF THE INVENTION

This invention was developed in an effort to overcome the above-mentioned problems, and has as an object the provision of an air bag apparatus that presents a good appearance at the interface between a cover, which opens when an air bag inflates, and its periphery, reduces the number of components necessary for assembly and shortens the assembly process.

The air bag apparatus according to the present invention includes a cover unit for covering an air bag that inflates upon the occurrence of a predetermined event. The cover unit comprises a cover that opens with the inflation of the air bag, and a body for holding the cover. The cover unit is made of an integrally molded product in which a skin is formed on a substrate, and includes, at the location connecting the periphery of the cover with the body, a breakaway portion along which the cover is separated from the body when the air bag inflates. A hinge portion maintains the connection between the body and the cover. Within the breakaway portion, the substrate has a fragile portion, and the skin is separated into two parts at the position of the fragile portion. At the hinge portion, the substrate and the skin are continuously formed and extend from the body to the cover.

BRIEF DESCRIPTION OF THE DRAWINGS

Other objects, features and characteristics of the present invention, as well as the methods of operation and functions of the related structural elements, will become apparent upon consideration of the following description and the appended claims with reference to the accompanying drawings, all of which form a part of this specification. In the drawings, like reference numerals designate corresponding parts.

DETAILED DESCRIPTION OF THE PRESENTLY PREFERRED EXEMPLARY EMBODIMENTS

An embodiment of the invention will be described with reference to the accompanying drawings.

Figure 3:
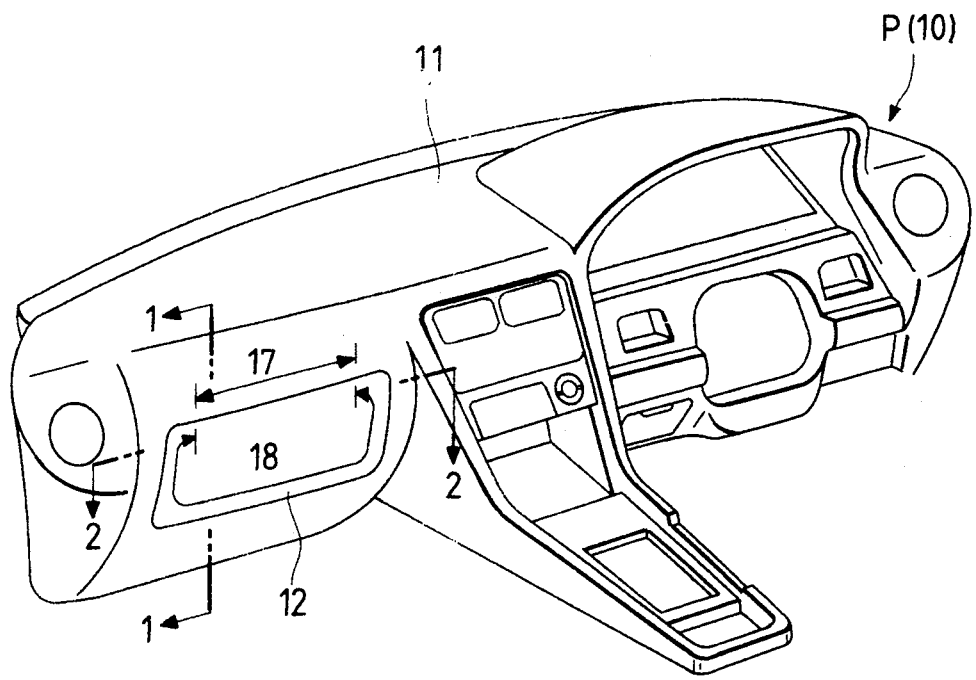
FIG. 3 is a perspective view illustrating the cover unit of the embodiment.

An air bag apparatus M is disposed in a panel P in front of a front passenger's seat of an automobile, as shown in FIG. 3. In the apparatus, the panel P functions as a cover unit 10 wherein a cover 12, which opens when the air bag 1 inflates, is formed.

Figure 1:
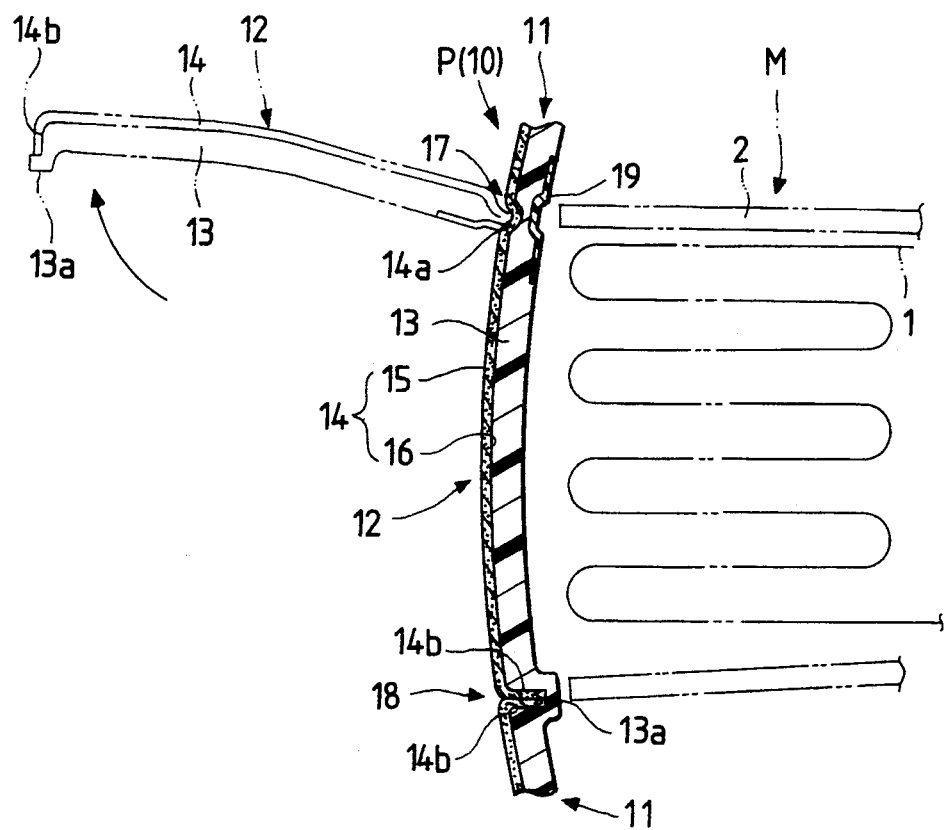
FIG. 1 is a sectional view illustrating one embodiment of the invention and taken along the line 1—1 of FIG. 3.
Figure 2:
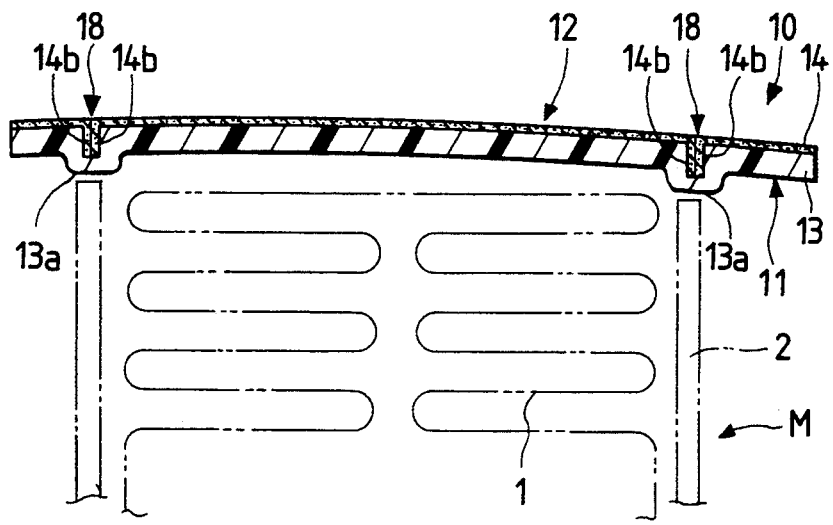
FIG. 2 is a sectional view illustrating the first embodiment taken along the line 2—2 of FIG. 3.

As shown in FIGS. 1 and 2, the cover unit 10, which is constituted by the panel P, is composed of an integrally molded product having a skin 14 formed on a substrate 13. The skin 14 consists of a surface layer 15 positioned on the surface side of the skin 14 and a foam layer 16 disposed on the side of the substrate 13.

The surface layer 15 may be made of, for example, TPO (thermoplastic olefin elastmer), PVC (polyvinyl chloride), urethane, etc., and the foam layer 16 may be made of PP (polypropylene) foam, PVC foam, urethane foam, etc. The skin 14 is formed by thermally bonding the surface layer 15 to the foam layer 16 and vacuum molding them into a shape corresponding to the outer shape of the cover unit 10.

The substrate 13 may be made of, for example, PPF (polypropylene with filler), polyester, TPO, polyurethane, etc., and is formed by setting a shaped skin 14 in a predetermined mold and thereafter performing a mold operation such as stamping, or injection.

To achieve the best adhesive properties possible between the substrate 13 and the skin 14, when the foam layer 16 is made of PP foam, it is preferable to use PPF or TPO as the material for the substrate 13, and, when the foam layer 16 is made of PVC foam, it is preferable to use polyester as the material for the substrate 13.

As shown in FIGS. 1 to 3, the cover unit 10 comprises a hinge portion 17 that maintains the connection between a body 11 and the cover 12 when the cover 12 opens, and a breakaway portion 18 along which the body 11 and the cover 12 separate from one another when the cover 12 opens. The breakaway portion 18 is positioned in a portion of the periphery of cover 12 so as to be substantially U-shaped as viewed from the front of the cover 12, and the hinge portion 17 is positioned along the remainder of the periphery of the cover 12. This configuration is illustrated in FIG. 3.

In the hinge portion 17, the substrate 13 is formed in a continuous manner extending from the body 11 to the cover 12, and a reinforcement material 19 such as a strong net band of aramid fiber is embedded in the substrate 13. Similarly, the skin 14 is formed in a continuous manner extending from the body 11 to the cover 12. The skin 14 is provided with a bent area 14a formed so as to project toward the substrate 13.

On the other hand, in the breakaway portion 18, the substrate 13 is provided with a thin fragile portion 13a so that the cover 12 can be separated from the body 11, and the skin 14 is provided with separating portions 14b and 14b, which can be separated from one another when pressed toward the substrate 13.

The process of manufacturing the cover unit 10 will now be described. First, a lamination of the skin layer 15 and the foam layer 16 is formed and then subjected to a vacuum forming process and a trimming process, thereby shaping the skin 14 into a shape corresponding to that of the cover unit 10.

Figure 4:
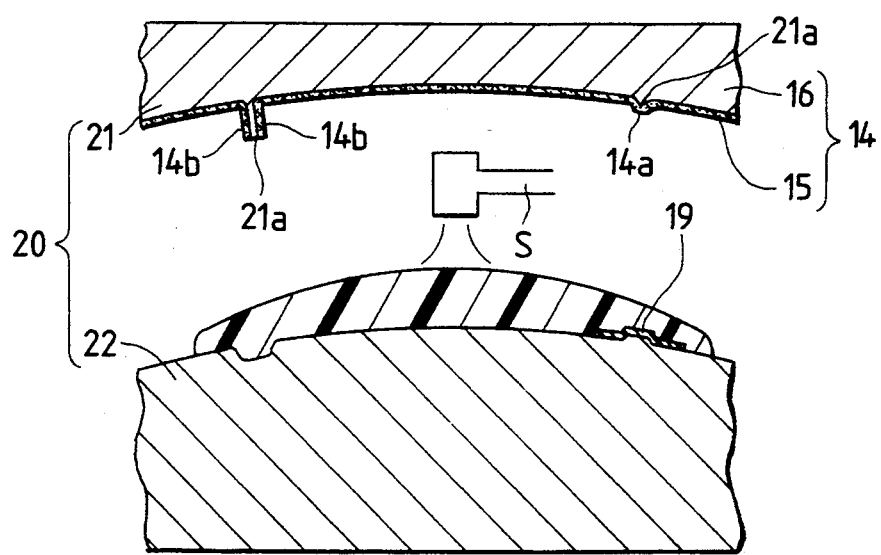
FIG. 4 is a sectional view illustrating the manner of shaping the cover unit of the embodiment.
Figure 5:
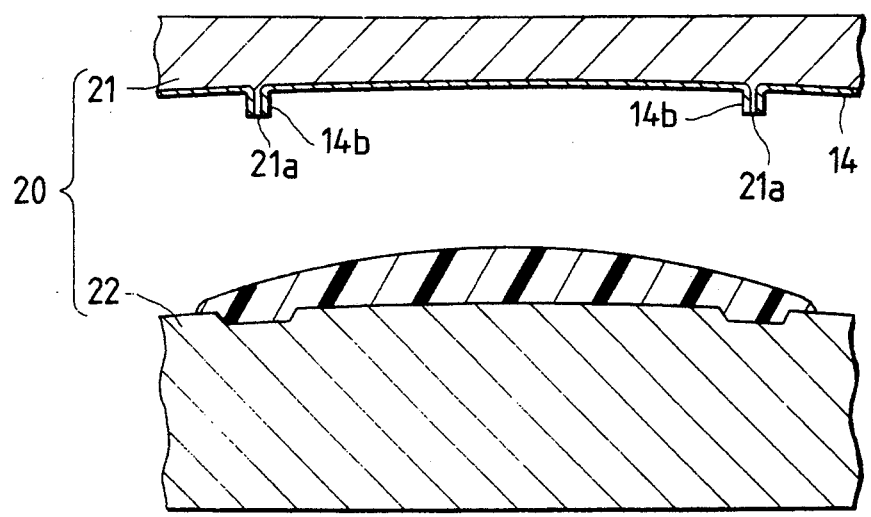
FIG. 5 is another sectional view illustrating the manner of shaping the cover unit of the embodiment.
Figure 6:
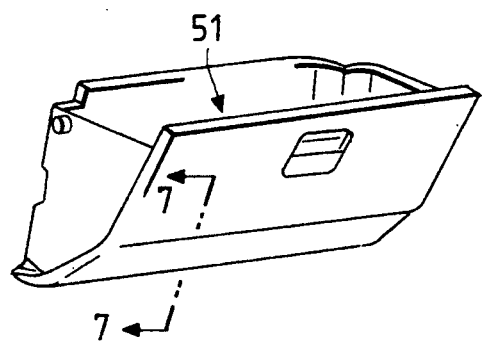
FIG. 6 is a perspective view of a glove box of the first embodiment.

The skin 14 is next configured into a predetermined shape and the reinforcement material 19 is respectively placed on one of the mold members 21 and 22 (in this embodiment mold member 22) of a mold 20 for the substrate 13, through a material supplying passage 'S' as shown in FIGS. 4 and 5. A molding material is put on the mold member 22 (in the case of a stamping mold), and the mold is closed to shape the substrate 13, thereby manufacturing the cover unit 10.

As shown in FIGS. 4 and 5, the mold member 21 on which the skin 14 is to be placed is provided with ridges 21a that will be inserted into the bent area 14a and the space between the separating portions 14b and 14b so that the bent area 14a is properly positioned. After the cover unit 10 is removed from the mold 20, the foam layer 16 on which the skin 14 is formed springs back to its initial thickness of its own accord, so that the gaps into which the ridges 21a have been inserted disappear. Therefore, the provision of the ridges 21a does not cause unnecessary gaps to appear on the skin 14 at the hinge portion 17 and at the breakaway portion 18.

In order to further explain why unnecessary gaps do not appear on the skin 14 at the hinge portion 17 and the breakaway portion 18, an example of a sheet in-mold molded product and a method of producing the same showing the above-mentioned property of the foam layer 16 springing back will now be described with reference to FIGS. 6-10.

As shown in FIGS. 6-10, the glove door 51 (sheet in-mold molded product) of this example comprises a sheet 61 including a surface layer 161 and a back foam layer 162, and a substrate 60, the sheet 61 and the substrate 60 being integrally molded together under low pressure. At the end portion of the sheet in-mold molded product 51, an end portion 163 of the sheet 61 is covered in a U-shaped manner by the substrate 60 which extends to the front side of the sheet 61. In other words, the substrate 60 has a U-shaped end portion 151 which covers the end portion 163 of the sheet 61 in a U-shaped manner.

The surface layer 161 of the glove door 51 is made of, for example, a polyvinyl chloride, the back foam layer 162 is made of, for example, foamed polypropylene, and the substrate 60 is made of, for example, polypropylene.

Figure 8:
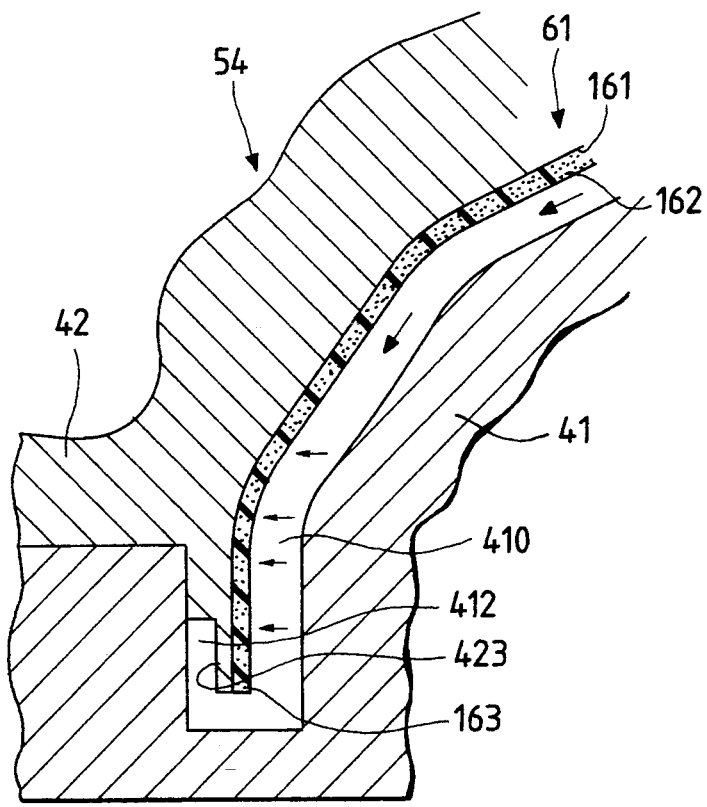
FIG. 8 is a sectional view of an important portion of a mold.

For molding the above sheet in-mold molded product, the sheet 61, including the surface layer 161 and the back foam layer 162 on the reverse side of the surface layer, is preformed by vacuum molding into a shape corresponding to the outer shape of the glove door 51. Further, the end portion of the sheet is trimmed into a shape necessary for the glove door 51. Then, the thus shaped sheet 61 is placed in a mold 54, as shown in FIG. 8.

The mold 54 comprises a lower mold member 41 and an upper mold member 42, and has a cavity 410 between the two mold members. The upper mold member 42 has a support plate 423 which is projected to contact the end portion 163 of the sheet 61. Provided between the reverse side of the support plate 423, on which the sheet is not to be placed, and the lower mold member 41 is a U-shaped portion or cavity 412 for forming the end portion 151 of the substrate. The thickness of the support plate 423 is about 0.6 mm.

For carrying out the molding, the sheet 61 is placed on the upper mold member 42. At this time, the surface layer 161 of the sheet 61 is held in contact with the upper mold member 42. The end portion 163 of the sheet 61 is placed on the support plate 423. Then, the upper mold member 42 and the lower mold member 41 are closed together, and the substrate material in a softened state is poured into the cavity 410.

During the pouring of the substrate material, the back foam layer 162 of the sheet 61 is urged toward the upper mold member 42 by a pouring pressure, thus compressing the back foam layer 162. The poured substrate material moves in the cavity 410, and fills in the U-shaped portion 412 at the reverse side of the support plate 423. Thereafter, the upper mold member 42 and the lower mold member 41 are separated from each other, and the sheet in-mold molded product is taken out.

Figure 7:
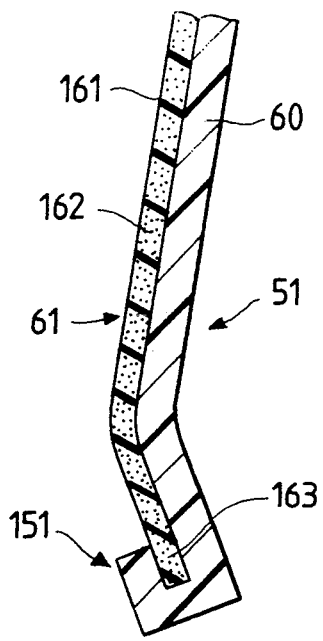
FIG. 7 is a sectional view taken along lines 7—7 in FIG. 6.
Figure 9:
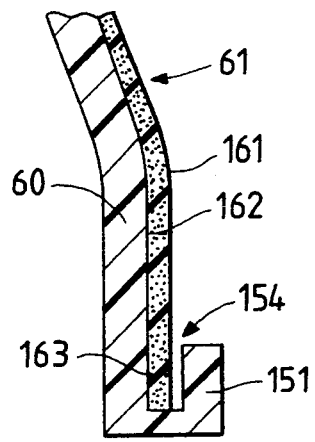
FIG. 9 is a sectional view of an end portion of the sheet in-mold molded product immediately after it is taken out from the mold.
Figure 10:
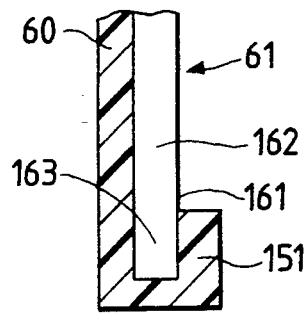
FIG. 10 is a sectional view showing the condition in which a back foam layer has sprung back and therefore has been restored to its initial condition.

As shown in FIG. 9, in the sheet in-mold molded product, the end portion 163 of the sheet 61 is covered by the U-shaped end portion 151 of the substrate 60. However, immediately after the molded product is taken out from the mold, the back foam layer 162 springs back from its compressed condition (which has been caused by the pouring pressure of the substrate material during the molding) into the initial, expanded condition. Therefore, as shown in FIG. 10, the gap 154 of FIG. 9 is substantially filled by the thickness of the restored sheet 61, so that the sheet 61 is held in intimate contact with the U-shaped end portion 151 of the substrate. As a result, the sheet in-mold molded product shown in FIG. 7 is obtained.

As described above, in the sheet in-mold molded product of this example, the substrate 60 is molded to be extended to the front side of the sheet 61 in a U-shaped manner to cover the end portion 163 of the sheet 61. Therefore, the end portions of the sheet 61 and the substrate 60 will not be separated from each other. Further, since these two end portions are integrally molded together, they will not be separated from each other even during a long period of use, in contrast with the case where they are bonded together by an adhesive.

The end portion processing does not need an adhesive, a tacker, a bezel and so on as is the case with the prior art, and therefore the appearance of the end portion, from the viewpoint of design, is excellent. For this reason, the cost is low.

In the above production method, the amount of compression of the back foam layer 162 by the poured substrate material and the thickness of the support plate 423 are coordinated such that when the back foam layer 162 springs back upon removal of the molded product from the mold, the gap 154 is substantially filled, so that the surface layer 161 of the sheet 61 is held in intimate contact with the inner surface of the U-shaped end portion 151 of the substrate. Therefore, in this embodiment, an end portion processing step is not needed, and the above excellent sheet in-mold molded product can be easily produced.

The thus manufactured cover unit 10 is attached to the chassis of an automobile by brackets (not shown) or the like which are formed at predetermined positions of the cover unit 10. A case 2 in which the folded air bag 1 and an inflator (not shown) are housed is disposed at the rear side of the cover 12, and attached to the chassis, whereby the assembly of the air bag apparatus M in the automobile is completed.

When the air bag 1 is supplied with a gas from the inflator (not shown) to begin to inflate, the fragile portion 13a of the substrate 13 in the breakaway portion 18 is broken, and the cover 12 then turns about the hinge portion 17 to open (as indicated by the dotted lines in FIG. 1), thereby allowing the air bag 1 to further inflate on the cover unit 10.

When the cover 12 opens, in the hinge portion 17, the skin 14 remains continuously formed while extending from the body 11 of the cover unit 10 to the cover 12, but in the breakaway portion 18, the skin 14 is separated into that on the side of the body 11 and that of the cover 12. Therefore, the skin 14 does not affect the opening operation of the cover 12.

The cover unit 10 is an integrally molded product which comprises the breakaway portion 18 and the hinge portion 17 and which is made of the substrate 13 and the skin 14, and it is not required to separately attach the cover 12, which opens when the air bag inflates, to the body 11. Accordingly, the number of components can of the air bag apparatus M can be reduced, and hence the process of assembling the air bag apparatus M can be shortened.

The cover 12, which opens when the air bag 1 inflates, is connected with the body 11 through the breakaway portion 18 and the hinge portion 17, and is formed so as to be continuous with the substrate 13, and can be molded to be integrated with the body 11. Therefore, it is possible to improve the appearance of the interface between the cover 12 and portions of the body 11 surrounding it.

In the air bag apparatus of the invention, the fragile portion of the substrate in the breakaway portion is broken when the air bag inflates. The cover opens in such a manner that it turns about the hinge portion, thereby allowing the air bag to further inflate on the cover unit. When the cover opens, since the skin is continuously formed and extends from the body to the cover in the hinge portion and separated into the body side and the cover side by the breakaway portion, the skin does not affect the opening operation of the cover.

The cover unit is an integrally molded product which comprises the breakaway portion and the hinge portion and which is composed of a substrate and a skin. It is not required to separately attach the cover which opens when the air bag inflates, to the body. Accordingly, the number of components can be reduced, and hence the process of assembling an air bag apparatus can be shortened.

The cover is connected with the body through the breakaway portion and the hinge portion, and formed on the continuous substrate, and can be molded to be integral with the body. Therefore, it is possible to improve the appearance of the interface between the cover and portions of the body surrounding it.

Consequently, according to the air bag apparatus of the invention, the appearance of the interface between the cover and portions surrounding the cover can be improved, the number of components can be reduced, and the assembly process can be shortened.

In the illustrated embodiment, the cover unit 10 is constructed so that the reinforcement material 19 such as a net band of aramid fiber is embedded in the substrate 13 in the hinge portion 17. Alternatively, the reinforcement material 19 may be a metal plate, such as an aluminum plate, having a thickness which exhibits the requisite flexibility and which is screwed to the body 11 and the cover 12. The reinforcement material 19 may be replaced only by forming the substrate 13 so as to make it thicker.

The embodiment has been described in which the fragile portion 13a of the substrate 13 provided in the breakaway portion 18 is formed by making the substrate 13 thinner. Since the skin 14 in the breakaway portion 18 is separated into two parts, the breaking strength of the cover unit at this position is weak even when the thickness of the substrate 13 in the breakaway portion 18 is made equal to that of the substrate 13 in the portion surrounding it. Furthermore, a fragile member may be separately inserted into the substrate 13 during the molding operation to be embedded therein. Namely, the structure of the fragile portion 13a is not limited to that in which the fragile portion 13a is realized by providing the substrate 13 with a thinner portion.

In the embodiment described above, in order to improve the appearance of the skin 14 in the hinge portion 17 and the breakaway portion 18, the bent area 14a and the separating portions 14b and 14b which cause the skin 14 to have an indent are formed. Alternatively, the bent area 14a is not provided in the hinge portion 17 so that the skin 14 has a flat surface.

While the present invention has been described above with respect to two preferred embodiments thereof, it should of course be understood that the present invention should not be limited only to these embodiments, but various changes or modifications may be made without departure from the scope of the invention as defined by the appended claims.

What is claimed is:

1. A dash panel unit including a cover member and a panel portion surrounding said cover member, the area between said cover member and said panel portion including a hinge portion and a breakable portion, said breakable portion between said cover member and said panel portion being under compression so that gaps existing during molding between said cover member and said panel portion disappear upon release from the mold, and said cover member includes an outer skin attached to an underlying foam layer and a supporting substrate secured to said foam layer on a side opposite said outer skin.

2. A dash panel unit as in claim 1 wherein said breakable portion includes a joint comprising two facing segments of said cover member and a thinned portion of said substrate.

3. A dash panel unit as in claim 1, further including an air bag assembly, covered by said cover member, that inflates on a predetermined event, said cover member opening upon inflation of said air bag assembly.

4. A dash panel unit as in claim 3, wherein said breakable portion includes said foam layer with the foam layer at said breakable portion being under compression.

5. A dash panel unit as in claim 4, wherein said cover member and said panel portion further include a surface layer disposed on said foam layer.

6. A dash panel unit as in claim 4, wherein said substrate is made of one of the group including polypropylene, thermoplastic olefin elastomer and polyester.

7. A dash panel unit as in claim 4, wherein said foam layer is made of one of the group including polypropylene, polyvinyl chloride and urethane.

8. A dash panel unit as in claim 4, wherein said substrate is made of one of the group including polypropylene and thermoplastic olefin elastomer and said foam layer is made of including polypropylene.

9. A dash panel unit as in claim 3, wherein said breakable portion is substantially U-shaped as viewed from the front of said cover member, and said hinge portion is positioned along the remainder of the periphery of said cover member.

10. A dash panel unit as in claim 4, wherein said substrate extends in a continuous manner.

11. A dash panel unit as in claim 10, wherein said foam layer within said breakable portion is separated into two parts with each of said two parts being under compression.

* * * * *